Feb. 3, 1959     A. H. DICKINSON     2,872,670
DEVICE TO MANIFEST AN UNKNOWN VOLTAGE AS A NUMERICAL QUANTITY
Filed Feb. 7, 1952     4 Sheets-Sheet 1
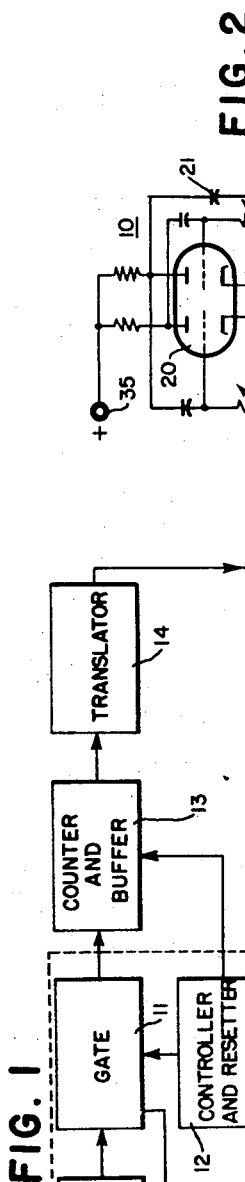
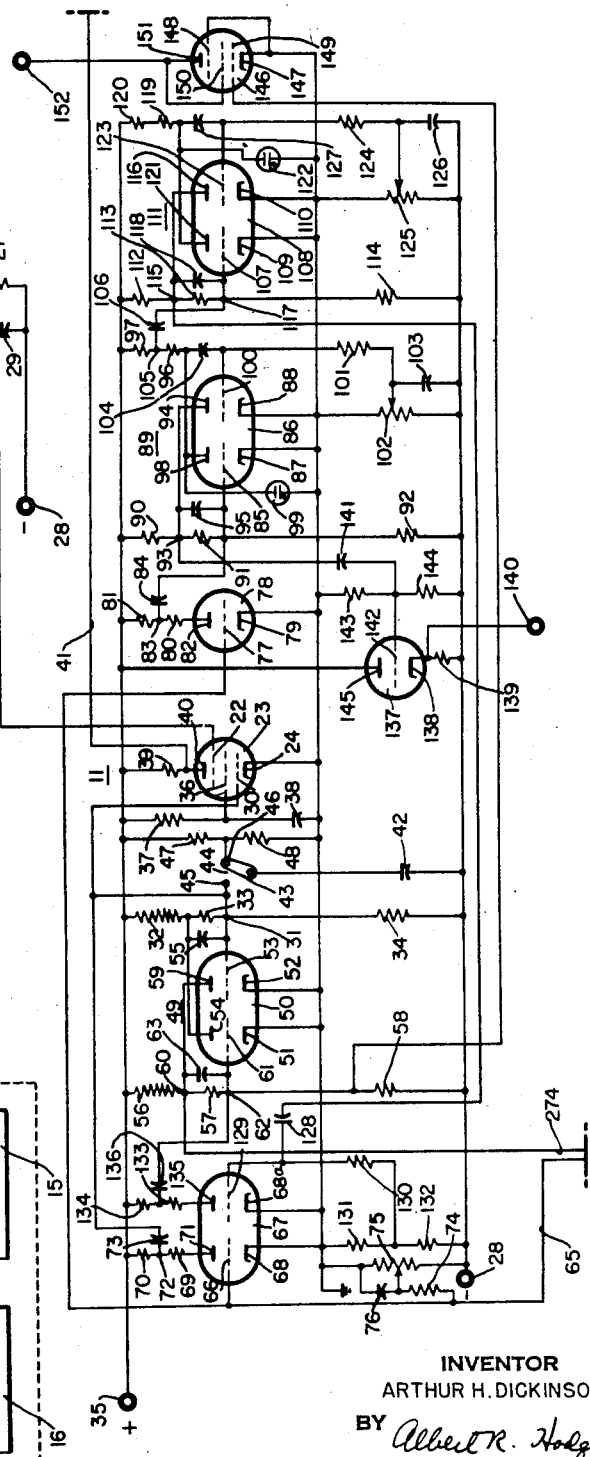
INVENTOR
ARTHUR H. DICKINSON
BY *Albert R. Hodges*
ATTORNEY Feb. 3, 1959  A. H. DICKINSON  2,872,670
DEVICE TO MANIFEST AN UNKNOWN VOLTAGE AS A NUMERICAL QUANTITY
Filed Feb. 7, 1952  4 Sheets-Sheet 2

INVENTOR
ARTHUR H. DICKINSON
BY *Albert R. Hodges*
ATTORNEY

INVENTOR
ARTHUR H. DICKINSON
BY *Albert R. Hodges*
ATTORNEY

Feb. 3, 1959    A. H. DICKINSON    2,872,670
DEVICE TO MANIFEST AN UNKNOWN VOLTAGE AS A NUMERICAL QUANTITY
Filed Feb. 7, 1952    4 Sheets-Sheet 4

INVENTOR
ARTHUR H. DICKINSON
BY Albert R. Hodges
ATTORNEY

United States Patent Office 2,872,670
Patented Feb. 3, 1959

2,872,670

DEVICE TO MANIFEST AN UNKNOWN VOLTAGE AS A NUMERICAL QUANTITY

Arthur H. Dickinson, Greenwich, Conn., assignor to International Business Machines Corporation, New York, N. Y., a corporation of New York Original application May 26, 1951, Serial No. 228,432, now Patent No. 2,717,994, dated September 13, 1955. Divided and this application February 7, 1952, Serial No. 270,411

3 Claims. (Cl. 340—347)

This application is a division of application Serial No. 228,432 filed May 26, 1951, now Patent 2,717,994 issued September 13, 1955, which invention relates to measuring and indicating systems, and more particularly to improved means for measuring and indicating or manifesting the value of a variable quantity such as an electrical potential or a physical displacement.

A principal object of the present invention is to provide digital manifestation of a variable quantity with a high degree of linearity, sensitivity, accuracy and reproductibility.

Another object of the present invention is the provision of digital manifestation of a variable quantity without appreciably loading the source of the quantity.

A further object of the present invention is to provide a plurality of successive digital manifestations of a variable quantity automatically.

Still another object of the present invention is to provide a digital manifestation which is equal to the actual value of a variable quantity.

An additional object of the present invention is the provision of a digital manifestation which is proportional to the actual value of a variable quantity.

In accordance with the present invention, there is provided a variable quantity measuring and manifesting device which comprises the combination of a plurality of structural elements. These elements include a source of oscillations, and a register responsive to these oscillations. Gating means are interposed between the source of oscillations and the register, and these gating means are adapted to control the flow of oscillations therebetween. Translating means are provided which are adapted for developing a potential proportional to the setting of the register. Means are provided for comparing this potential with the variable quantity to be measured, and for actuating the gating means when the potential is proportional to the variable quantity. Means are also provided for manifesting or indicating the setting of the register.

In accordance with an important feature of the present invention, the means responsive to the comparing means for actuating the gating means are also adapted for causing a delayed resetting of the register to a predetermined value when the changing potential is proportional to the variable quantity, and the means for manifesting the setting of the register are arranged to operate between the actuation of the gating means and the delayed resetting of the register to the above-mentioned predetermined value. In accordance with this feature of the present invention, a plurality of successive digital manifestations of a variable quantity may be automatically secured.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Fig. 1 is a block diagram of a measuring and indicating device in accordance with the present invention;

Fig. 2 is a schematic circuit diagram of the oscillator, date, and controller and resetter units of Fig. 1;

*The system as a whole*

Figure 3:
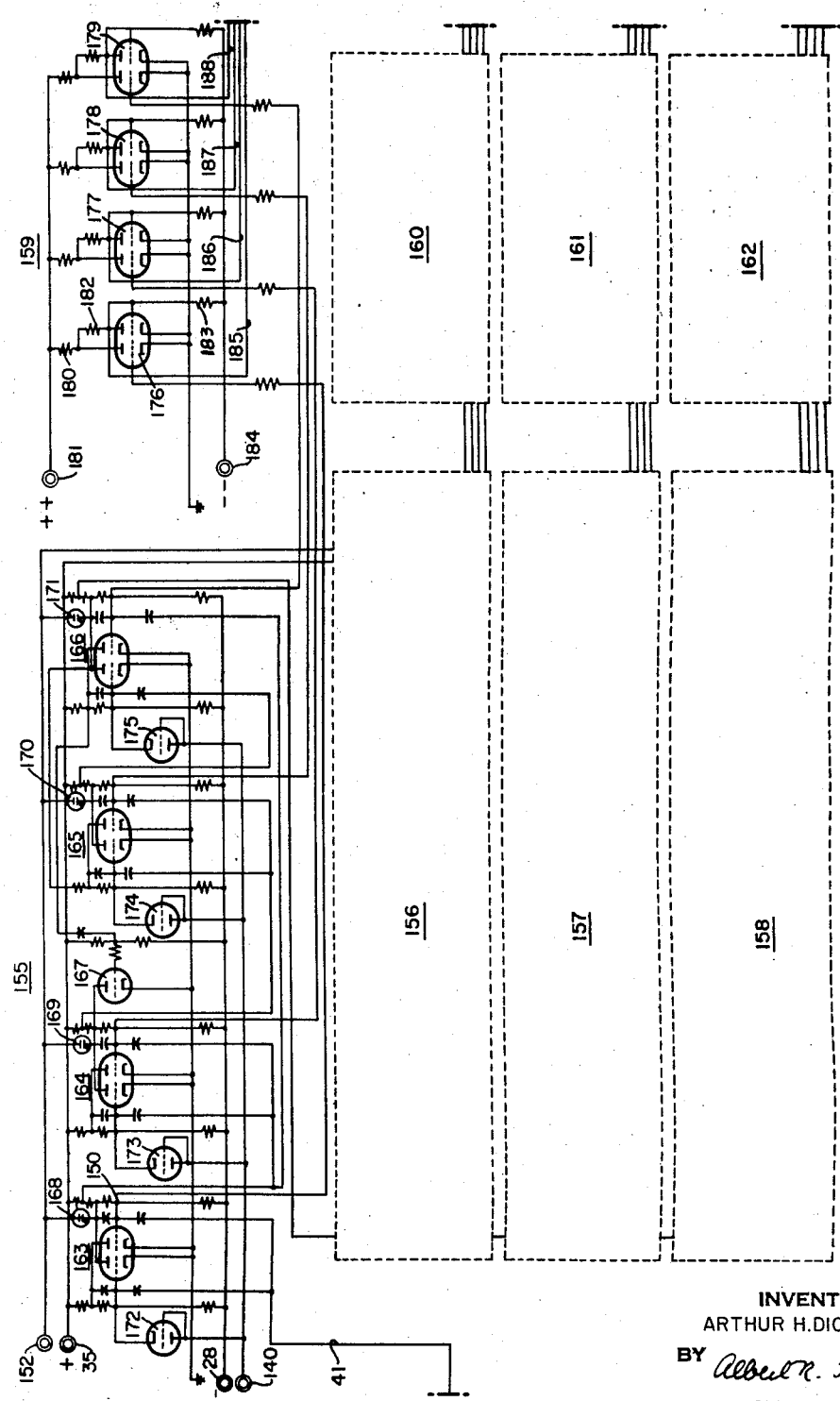
Fig. 3 is a schematic circuit diagram of the register or counter and buffer unit of Fig. 1, certain of the duplicate elements having been illustrated in block form.

Referring to Fig. 1, there is shown a variable quantity measuring and manifesting device in accordance with the present invention which comprises an oscillator unit 10, a gate unit 11, a controller and resetter unit 12, a register or counter and buffer unit 13, a translator unit 14, a comparer unit 15, and a source of variable quantity unit 16. When the system is in operation, oscillator 10 produces a steady train of pulses which are supplied to gate unit 11. Gate unit 11 is under control of unit 12. Each complete cycle of operation of the system comprises two portions, the first of which is utilized for determining the digital value of the unknown variable quantity, and the second of which is utilized for manifesting or indicating this value. Let it be assumed that a cycle has been manually initiated, so that controller unit 12 causes gate unit 11 to open. Under this condition, the pulses from oscillator unit 10 pass through gate unit 11 into counter and buffer unit 13, in which they are counted.

The digital value developed in counter and buffer unit 13 is now converted, by means of translator unit 14, into an electrical potential which is a direct function of the setting of counter unit 13. This potential is compared, in comparer unit 15, with the unknown variable quantity provided by unit 16. When the potential from unit 14 is proportional to or equal to the variable quantity from unit 16, comparer unit 15 causes controller and resetter unit 12 to close gate 11. This corresponds with the end of the first portion of the operating cycle. After a short delay corresponding with the second portion of the operating cycle and during which the counter setting may be read or otherwise utilized, controller and resetter unit 12 causes counter and buffer unit 13 to be reset to its initial value, thus preparing this unit for the next successive operating cycle. This initial or predetermined value may be 0000 or any other desired setting which is not higher than the setting corresponding to the lowest value to be measured.

*The oscillator, gate and controller units*

Referring to Fig. 2 of the drawings, oscillator 10 comprises an electron discharge device 20, preferably of the double triode type, arranged to operate as a conventional multivibrator to provide a continuous train of output pulses. These pulses are supplied, by means of a coupling capacitor 21, to the suppressor electrode 22 of an electron discharge device 23, preferably of the pentode type with its cathode 24 grounded as shown. Suitable direct-current bias is applied to suppressor electrode 22 through a resistor 25, the lower end of which is connected to the movable arm 26 of a potentiometer 27, which in turn is shunted between ground and a suitable source of negative potential 28. Arm 26 is bypassed to source 28 by a capacitor 29.

Electron discharge device 23 comprises the gate. Control electrode 30 is connected to junction 31 in a potential divider comprising resistors 32, 33 and 34 in series between positive potential source 35 and negative potential source 28. The potential of junction 31 is normally such that discharge device 23 is substantially non-conductive. Screen electrode 36 of discharge device 23 is connected by a resistor 37 to positive potential source 35, and is bypassed to ground by a capacitor 38. A resistor 39 is connected between positive potential source 35 and anode 40 of discharge device 23, and a lead 41 is connected to anode 40 for the purpose of supplying output pulses from the gate to counter and buffer unit 13 (Fig. 3).

For the purpose of manually causing the gate to open, there is provided a capacitor 42 connected between negative potential source 28 and the movable arm 43 of a SPDT switch 44, the left-hand terminal 45 of which connects to junction 31 and the right-hand terminal 46 connects to the junction of resistors 47 and 48 in series between positive potential source 35 and ground. When switch arm 43 is thrown to the right, capacitor 42 becomes charged to a potential corresponding to the potential difference between switch terminal 46 and source 28. Throwing switch arm 43 to the left causes capacitor 42 to discharge, raising the potential of junction 31 to somewhat above ground potential, so that gate discharge device 23 may conduct whenever a positive-going pulse is applied to its suppressor electrode 22 by oscillator 10 through capacitor 21. This in turn causes a negative-going pulse to be developed in output lead 41 for application to counter unit 13 (Fig. 3).

A gate trigger circuit 49 is provided, comprising an electron discharge device 50 preferably of the type having a pair of triode portions. This device operates as a conventional bi-stable multivibrator. Cathodes 51 and 52 are grounded. Right-hand control electrode 53 is connected to junction 31. Left-hand anode 54 is connected to the junction of resistors 32 and 33, and a capacitor 55 is shunted across resistor 33. A series network comprising resistors 56, 57 and 58 is connected between positive potential source 35 and negative potential source 28. Right-hand anode 59 of discharge device 50 is connected to junction 60 of resistors 56 and 57, and left-hand control electrode 61 is connected to junction 62 of resistors 57 and 58. A capacitor 63 is shunted across resistor 57. The potentials of junctions 31 and 62 are normally such that the left-hand portion of discharge device 50 is conductive and its right-hand portion non-conductive. This condition may be designated the "off" condition of the gate trigger circuit, the opposite condition being designated the "on" condition. The latter condition results, for example, when switch arm 43 is thrown to the left.

For the purpose of turning gate trigger circuit 49 off automatically, and hence causing gate 11 to be closed at a desired time, positive pulses are developed in comparer unit 15 (Fig. 5) and supplied by means of lead 65 to left-hand control electrode 66 of dual electron discharge device 67, cathodes 68 and 68a of which are grounded. Resistors 69 and 70 are connected in series between left-hand anode 71 of discharge device 67 and positive potential source 35, and their junction 72 is coupled by means of a capacitor 73 to junction 31. The left-hand portion of discharge device 67 is maintained normally non-conductive by the application, through a resistor 74, of a suitable negative potential to control electrode 66, this potential being derived from a potentiometer 75 shunted between ground and negative potential source 28, the movable arm being bypassed to ground by a capacitor 76. A positive pulse applied to control electrode 66 by lead 65 causes the left-hand portion of discharge device 67 to become momentarily conductive, the resultant negative-going pulse at junction 72 turning gate trigger circuit 49 off and causing gate 11 to be closed.

To provide automatic resetting of the system after a predetermined time interval, which may be referred to as delayed resetting, lead 65 is also connected to control electrode 77 of an electron discharge device 78, preferably of the triode type with its cathode 79 grounded. Resistors 80 and 81 are connected in series between anode 82 of discharge device 78 and positive potential source 35. Junction 83 of resistors 80 and 81 is coupled by a capacitor 84 to left-hand control electrode 85 of a dual electron discharge device 86 having its cathodes 87 and 88 grounded and being arranged, with the associated components, to operate as a conventional self-restoring trigger circuit 89 in which the left-hand portion is normally conductive, this condition being designated the "off" condition of the circuit. A series network comprising resistors 90, 91 and 92 is connected between positive potential source 35 and negative potential source 28. The junction 93 of resistors 90 and 91 is connected to right-hand anode 94 of discharge device 86. A capacitor 95 is shunted across resistor 91. Resistors 96 and 97 are connected between left-hand anode 98 of discharge device 86 and positive potential source 35. A neon indicator tube 99 is connected between left-hand anode 98 and ground. Right-hand control electrode 100 of discharge device 86 is connected through a resistor 101 to the movable arm of a potentiometer 102 shunted between ground and negative potential source 28, the movable arm being bypassed to source 28 by a capacitor 103. A capacitor 104 is connected between right-hand control electrode 100 and left-hand anode 98.

The junction 105 of resistors 96 and 97 is coupled by a capacitor 106 to left-hand control electrode 107 of a dual electron discharge device 108 having its cathodes 109 and 110 grounded and being arranged, with the associated components, to operate as a conventional self-restoring trigger circuit 111. A series network comprising resistors 112, 113 and 114 is connected between positive potential source 35 and negative potential source 28, the junction 115 between resistors 112 and 113 being connected to right-hand anode 116 of discharge device 108, and the junction 117 of resistors 113 and 114 being connected to left-hand control electrode 107. A capacitor 118 is shunted across resistor 113. Resistors 119 and 120 in series are connected between the left-hand anode 121 of discharge device 108 and positive potential source 35. A neon indicator tube 122 is connected between left-hand anode 121 and ground. Right-hand control electrode 123 of discharge device 108 is connected through a resistor 124 to the movable arm of a potentiometer 125 shunted between ground and negative potential source 28, the movable arm of the potentiometer being bypassed to source 28 by a capacitor 126. A capacitor 127 is connected between left-hand anode 121 and right-hand control electrode 123. Junction 115 is coupled by a capacitor 128 to right-hand control electrode 129 of discharge device 67. A potential suitable for maintaining the right-hand portion of discharge device 67 normally non-conductive is applied to right-hand control electrode 129 through a resistor 130 from a voltage divider comprising resistors 131 and 132 connected in series between ground and negative potential source 28. Resistors 133 and 134 are connected between right-hand anode 135 of discharge device 67 and positive potential source 35, their junction being coupled by a capacitor 136 to left-hand control electrode 61 of discharge device 50.

In operation, automatic resetting of the system after a predetermined time interval is achieved in the following manner. A positive pulse on lead 65 renders discharge device 78 conductive, producing a negative-going pulse at junction 83. This in turn turns self-restoring trigger circuit 89 on, in which condition it remains for a period of time determined by the values of capacitor 104 and resistors 97, 96 and 101, and by the bias potential due to the setting of potentiometer 102. When trigger circuit 89 switches off, the negative-going pulse at junction 105 causes self-restoring trigger circuit 111 to be switched on, a condition which is maintained for an interval of time dependent upon the values of the components comprising this circuit. When trigger circuit 111 switches off, the positive-going pulse appearing at junction 115 is applied by means of capacitor 128 to right-hand control electrode 129 of discharge device 67, thus causing the right-hand portion of this device to become conductive and a negative-going pulse to be developed at junction 62. This pulse causes gate trigger circuit 49 to switch on, which in turn causes gate 11 to open, thus initiating a new complete cycle.

For the purpose of actuating the resetting diodes in counter and buffer unit 13 (Fig. 3), there is provided an electron discharge device 137 (Fig. 2), preferably of the triode type and having a cathode 138 connected by means of a resistor 139 to negative potential source 28. Cathode 138 is also connected to an output terminal 140. Junction 93 is coupled by means of a capacitor 141 to control electrode 142 of device 137. To maintain the desired normal degree of conductivity of discharge device 137, network comprising resistors 143 and 144 is connected between ground and negative potential source 28, the junction of these resistors being connected to control electrode 142. Anode 145 of discharge device 137 is connected to positive potential source 35. When self-restoring trigger circuit 89 switches off, as described above, the right-hand portion of discharge device 86 becomes non-conductive, so that a positive-going pulse is developed at junction 93 and applied through capacitor 141 to control electrode 142 of discharge device 137, thus rendering this discharge device substantially more conductive and producing an appreciably greater potential drop across resistor 139. This potential drop is utilized, through output terminal 140, in a manner to be described in connection with Fig. 3.

For the purpose of maintaining extinguished the indicators forming a part of counter and buffer unit 13 (Fig. 3) during a desired portion of each complete cycle of operation, there is provided an electron discharge device 146, preferably of the pentode type and having its cathode 147 and its suppressor electrode 148 grounded. Control electrode 149 of discharge device 146 is connected to junction 62 of gate trigger circuit 49. Screen electrode 150 and anode 151 of discharge device 146 are connected together and to an output terminal 152. In operation, discharge device 146 is normally non-conductive, thus interrupting the return path for the indicators of counter and buffer unit 13 (Fig. 3). At the beginning of a cycle, the negative-going pulse which is developed at junction 62 switches trigger circuit 49 on, as explained above, and the resultant negative potential is applied to control electrode 149 of discharge device 146, thus rendering this discharge device substantially non-conductive, thereby extinguishing the indicators of the counter unit. These are maintained in this condition for a desired portion of the complete operating cycle.

*The counter and buffer unit*

Referring to Fig. 3 of the drawings, the register or counter comprises four denominational orders, respectively designated as the units order 155, the tens order 156, the hundreds order 157, and the thousands order 158. Associated with the counters are corresponding buffers 159, 160, 161 and 162. To avoid unnecessary complication, only units order 155 of the counter and associated buffer 159 are shown in detail, the remaining orders of the counter and the other buffers being identical in internal arrangement.

Each order of the counter is constructed and operates as disclosed and claimed in copending application, Serial No. 654,175, of Byron E. Phelps, filed March 13, 1946, now Patent No. 2,584,811, and assigned to the same assignee as the present application. Units order 155 comprises four bi-stable trigger circuits 163, 164, 165 and 166, each including an electron discharge device of the dual type as shown, and a delayed action blocking tube 167. Associated with the left-hand portion of each discharge device of circuits 163–166 is a neon indicator or glow tube, these tubes being designated respectively 168, 169, 170 and 171. As input pulses are applied by means of lead 41, units order 155 manifests or counts on a tens notational basis and, upon passage from 9 to 0, a carry is passed from units order 155 to tens order 156.

Assuming for the moment that units order 155 is in its initial condition, i. e., set for a reading of 0000, the left-hand portion of each of the discharge devices of trigger circuits 163–166 is conducive and the right-hand portions of these devices are non-conductive. This may be designated the "off" condition of each trigger circuit. A negative-going input pulse on lead 41 will have no effect upon the right-hand portion of the discharge device of trigger circuit 163, since the control electrode of this portion is already sufficiently negative to render this portion non-conductive, but the negative-going input pulse will cause the left-hand portion of the discharge device of trigger circuit 163 to shift from its conductive to its non-conductive condition, since the potential of the control electrode of this portion is driven substantially negative from its original value. This condition may be designated the "on" condition of each trigger circuit. This in turn causes the left-hand anode to rise in potential, so that indicator tube 168 breaks down and produces a visible glow.

The trigger circuits comprising each order are connected in tandem, the impulses to be counted being introduced at one point only. Accordingly, the trigger circuits in each order of the counter effect the following pattern for each ten pulses applied to the input, units order 155 being used as an illustration:

| Input Pulse | Trigger Circuit | | | |
| --- | --- | --- | --- | --- |
| | 163 | 164 | 165 | 166 |
| 0 | Off | Off | Off | Off. |
| 1 | On | Off | Off | Off. |
| 2 | Off | On | Off | Off. |
| 3 | On | On | Off | Off. |
| 4 | Off | Off | On | Off. |
| 5 | On | Off | On | Off. |
| 6 | Off | On | On | Off. |
| 7 | On | On | On | Off. |
| 8 | Off | Off | Off | On. |
| 9 | On | Off | Off | On. |
| 10 | Off | Off | Off | Off. |

For the purpose of restoring trigger circuits 163–166 to their off condition upon the completion of each count, there are provided diodes 172, 173, 174 and 175, having their cathodes connected respectively to the left-hand control electrodes of the discharge devices of trigger circuits 163–166, and having their anodes each connected to terminal 140 (Fig. 2). It will be recalled that this terminal is rendered substantially positive near the completion of each operating cycle, thereby causing diodes 172–175 to become conductive, which in turn switches off any of trigger circuits 163–166 which are on. Thus the counter is automatically reset to 0000 in preparation for the next counting cycle.

Figure 4:
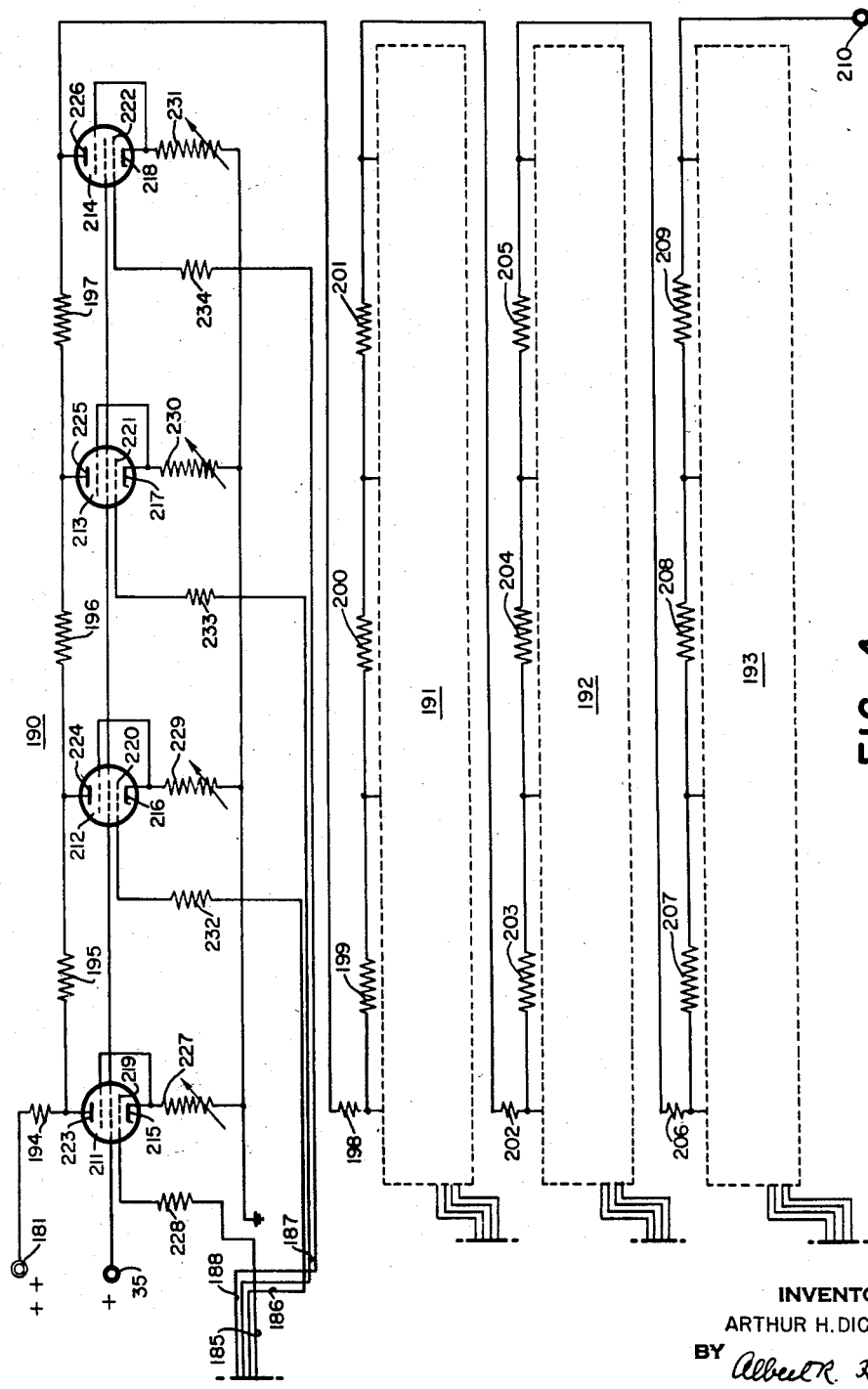
Fig. 4 is a schematic circuit diagram of the translator unit of Fig. 1, blocks being used to represent certain of the duplicate elements to avoid unnecessary complexity.

Associated with trigger circuits 163–166 are buffer elements comprising respectively dual electron discharge devices 176, 177, 178 and 179 which together comprise units order buffer 159. It will be understood, of course, that each dual discharge device may be replaced by two separate discharge devices if desired, or by one discharge device and a rectifier having a relatively high ratio between its forward and backward resistances. When trigger circuit 163 is on, the right-hand control electrode of its dual electron discharge device is at substantially ground potential. As shown, this electrode is connected to the left-hand control electrode of discharge device 176 so that this portion of this device is highly conductive and there is a substantial potential drop across associated load impedance element or resistor 180 connected between the left-hand anode of device 176 and a source 181 of high positive potential. A second impedance element or a resistor 182 is connected between the left- and right-hand anodes of discharge device 176, the right-hand anode being connected to the right-hand control electrode to form a diode and being connected through a third impedance element or resistor 183 to a source 184 of high negative potential. Resistors 182 and 183 are so proportioned that when the left-hand portion of discharge device 176 is highly conductive the right-hand anode of this discharge device is substantially negative with respect to ground. Under this condition, the right-hand portion of discharge device 176 is non-conductive and has no effect upon the operation of the buffer. On the other hand, when trigger circuit 163 is off, the left-hand portion of discharge device 176 is non-conductive, so that the potential of the right-hand anode of discharge device 176 tends to rise above ground potential. The right-hand portion of this discharge device comprises a clamping means which provides a clamping action, however, with the result that the right-hand anode of this device under this condition is maintained at a potential very close to ground potential. By means of a lead 185, the potential of this anode is applied to units order 190 of translator unit 14 (Fig. 4). Similar output potentials are developed by discharge devices 177, 178 and 179, and passed on to the units order of translator unit 14 respectively by leads 186, 187 and 188. In the manner just described, therefore, a plurality of output voltages are provided, each of which is either substantially negative with respect to ground or maintained very closely at ground potential, depending upon whether or not the corresponding trigger circuit of units order 155 of the counter is on or off. It will be understood that similar output potentials are developed in buffers 160, 161 and 162, and passed on to the corresponding orders 191, 192 and 193 of translator unit 14 (Fig. 4).

*The translator unit*

Referring to Fig. 4 of the drawings, the translator unit comprises the units order translator 190, the tens order translator 191, hundreds order translator 192, and the thousands order translator 193, associated respectively with buffers 159, 160, 161 and 162 (Fig. 3). Only units translator 190 is shown and described in detail, since translators 191, 192 and 193 are constructed and operate in an identical manner.

The translator comprises impedance elements or resistors 194–209 connected between high positive potential source 181 and translator output terminal 210. Units order translator 190 comprises electron discharge devices 211, 212, 213 and 214, preferably of the pentode type, and respectively having cathodes 215, 216, 217 and 218, control electrodes 219, 220, 221 and 222, and anodes 223, 224, 225 and 226. The suppressor electrodes of these discharge devices are connected respectively to their cathodes, and the screen electrodes are connected to positive potential source 35.

Cathode 215 of discharge device 211 is connected to ground through an adjustable resistor 227. Control electrode 219 is connected by means of a resistor 228 to lead 185 from buffer 159 (Fig. 3). Anode 223 is connected to the junction of resistors 194 and 195. Discharge devices 212, 213 and 214 have their cathodes 216–218 connected to ground respectively through adjustable resistors 229, 230 and 231. Their control electrodes 220–222 are connected by resistors 232, 233 and 234 respectively to leads 186, 187 and 188 from buffer 159 (Fig. 3). Anode 224 of discharge device 212 is connected to the junction of resistors 195 and 196, anode 225 of discharge device 213 to the junction of resistors 196 and 197, and anode 226 of discharge device 214 to the junction of resistors 197 and 198. Although not shown in detail in Fig. 4, it will be understood that similar connections from the terminals of resistors 198–209 are made to the anodes of the four electron discharge devices disposed in each of translators 191, 192 and 193.

It will be recalled from the description of Fig. 3 that leads 185–188 are either substantially negative with respect to ground or are maintained very closely at ground potential, depending upon whether or not the corresponding trigger circuit of units order 155 of the counter is on or off. Assume for the moment that trigger circuit 163 of counter 155 is off. Under this condition, lead 185 is very closely at ground potential, so that electron discharge device 211 is conductive, the degree of conductivity being readily adjusted by means of adjustable resistor 227. Because of the inherent characteristic of a pentode, the resultant current flow remains substantially uniform in spite of variations in the potential drop across the discharge device. This conductivity of discharge device 211 produces a predetermined potential drop across resistor 194. Now let it be assumed that trigger circuit 163 of counter 155 (Fig. 3) is on, so that lead 185 is maintained at a substantially negative potential with respect to ground. This renders discharge device 211 non-conductive with the result that there is no potential drop across resistor 194 due to anode current flowing in discharge device 211. A similar operation occurs in each of the remaining discharge devices comprising the translator unit, so that the total potential drop across resistors 194–209 due to the anode currents of these discharge devices is a direct function of the on and off pattern established in counters 155, 156, 157 and 158. By proper choice of the values of resistors 194–209, it is possible to secure a desired potential difference between positive potential source 181 corresponding with the count momentarily present in the counter units of Fig. 3.

By way of specific example, let it be assumed that resistors 194–209 have the following resistance values, expressed in ohms:

| Resistor: | Resistance in ohms |
|---|---|
| 194 | 10 |
| 195 | 10 |
| 196 | 20 |
| 197 | 40 |
| 198 | 20 |
| 199 | 100 |
| 200 | 200 |
| 201 | 400 |
| 202 | 200 |
| 203 | 1000 |
| 204 | 2000 |
| 205 | 4000 |
| 206 | 2000 |
| 207 | 10,000 |
| 208 | 20,000 |
| 209 | 40,000 |

Now let it be assumed that each electron discharge device is adjusted to have an anode current of 1.0 milliampere when it is conductive. Under these conditions, if all 16 electron discharge devices are conductive the total potential drop between positive potential source 181 and output terminal 210 due to their anode currents will be 166.65 volts. This is the condition which corresponds with the 0000 setting of the counter. Assume now that the counter has advanced to 0001, so that discharge device 211 is rendered non-conductive and the current through resistor 194 is 0.001 ampere less than previously, with the result that the potential of output terminal 210 rises toward that of positive potential source 181 by 0.01 volt. Upon reaching the maximum count of 9999, output terminal 210 will have risen toward positive potential source 181 by a total of 99.99 volts.

It will be seen from this specific example, therefore, that the values of resistors 194–209 are such that, as the counter progresses incrementally from 0000 to 9999, the voltage difference between output terminal 210 and positive potential source 181 decreases by 0.01 volt for each unit count applied to the input of the counter. It is this potential change which forms the output of translator unit 14 and which is applied to comparer unit 15 (Figs. 1 and 5).

*The comparer unit*

Figure 5:
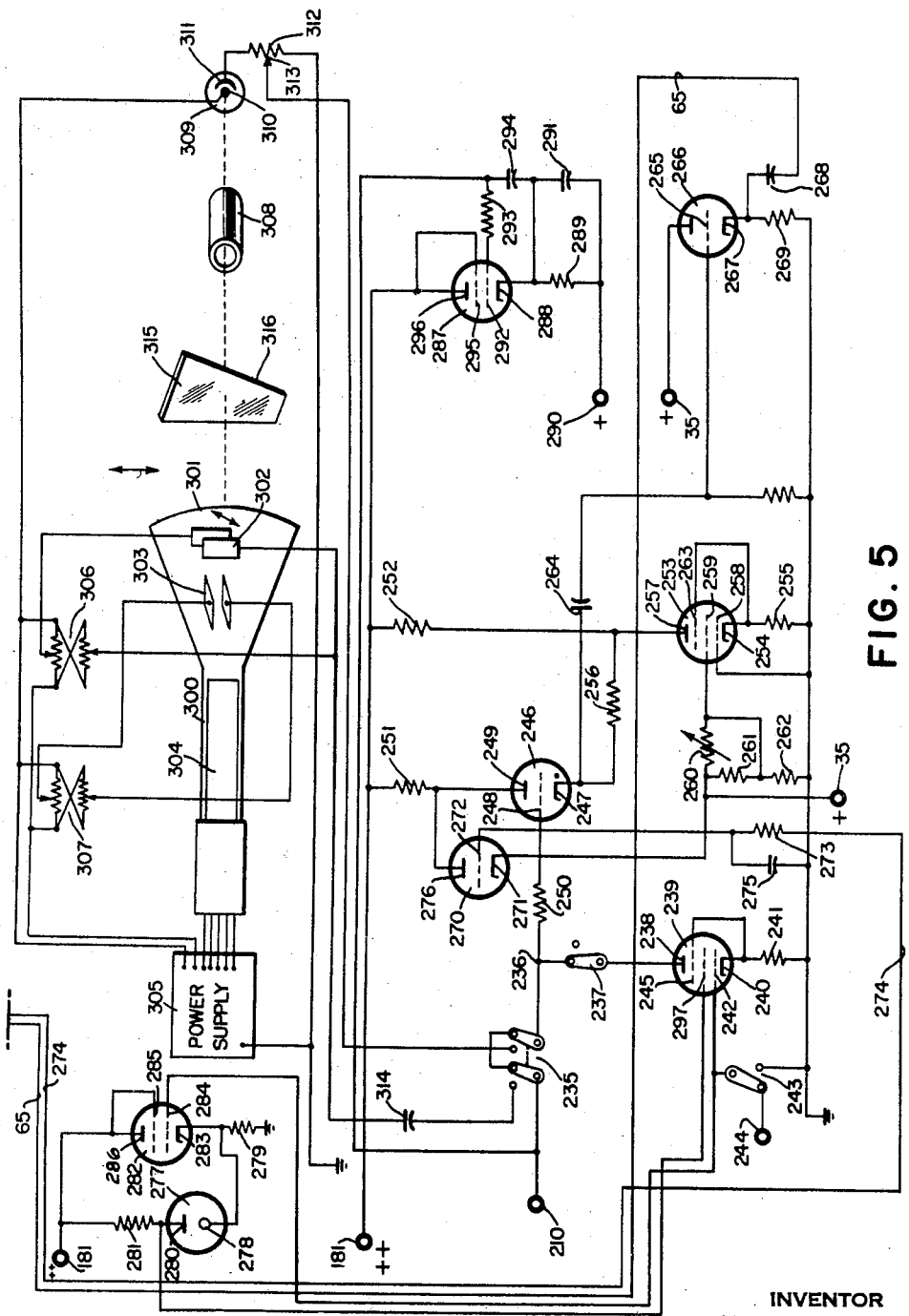
Fig. 5 is a schematic circuit diagram of the comparer unit and the source of variable quantity unit of Fig. 1.

Referring to Fig. 5 of the drawings, terminal 210, comprising the output terminal of translator unit 14 (Fig. 4), is connected through a DPDT switch 235 to a junction 236. Junction 236 is connected through an SPDT switch 237 to anode 238 of an electron discharge device 239 of the pentode type. When switches 235 and 237 are in the positions shown, the comparer unit is adapted to utilize an unknown variable quantity comprising an electrical potential. The system will first be described for operation with this type of unknown input variable.

Cathode 240 of discharge device 239 is grounded through a resistor 241. Control electrode 242 is connected by a switch 243 either to input terminal 244, to which the unknown potential is applied, or to ground. The potential of screen electrode 297 with respect to cathode 240 is maintained substantially constant by an arrangement which will be described later. Suppressor electrode 245 is connected to cathode 240.

It will be apparent that the potential of junction 236 with respect to ground will be dependent upon the potential drop in resistors 194–209 (Fig. 4) due both to the anode currents of the electron discharge devices of translator unit 14 and to the anode current of electron discharge device 239, as well as to the potential drop across resistor 241 due to the anode current of the latter discharge device. An increase in the anode current of discharge device 239, such as might be caused by applying an input potential between terminal 244 and ground, would tend to decrease the potential between junction 236 and ground. A decrease in the conductivity of one or more of the electron discharge devices of translator unit 14 would tend to cause an increase of potential at junction 236 with respect to ground.

In order to utilize this effect, there is provided a gaseous discharge device 246 having a cathode 247, a control electrode 248 and an anode 249. Control electrode 248 is connected to junction 236 by a resistor 250. A resistor 251 is connected between positive potential source 181 and anode 249. For the purpose of maintaining substantially constant the anode-cathode potential of discharge device 246 so that it will fire at fixed control-electrode potential, there is provided a series network between positive potential source 181 and ground comprising a resistor 252 and an electron discharge device 253, preferably of the pentode type and having a cathode 254 which is grounded through a resistor 255. A resistor 256 is connected between cathode 247 of discharge device 246 and anode 257 of device 253. Control electrode 258 of device 253 is grounded. Screen electrode 259 is connected through an adjustable resistor 260 to positive potential source 35, suitable additional resistors 261 and 262 being provided and arranged as shown. Suppressor electrode 263 is connected to cathode 254.

In operation, assuming first that counter unit 13 (Fig. 3) is set at 0000 and that switch 243 is in its right-hand position, resistor 260 is adjusted so that gaseous device 246 is barely extinguished. In other words, a small increase in the potential of junction 236 with respect to ground would cause discharge device 246 to fire, with the result that a large positive-going pulse is developed at cathode 247.

Now let it be assumed that switch 243 is in its left-hand position and that an unknown positive potential has been applied to input terminal 244. This causes the potential of junction 236 to decrease with respect to ground, so that control electrode 248 of discharge device 246 becomes more negative with respect to cathode 247. As previously described, however, counter unit 13 has begun counting, so that the potential drop across resistors 194–209 (Fig. 4) gradually decreases until the potential of junction 236 with respect to ground rises sufficiently to cause discharge device 246 to fire. The resultant positive-going pulse at cathode 247 is applied by means of a capacitor 264 to control electrode 265 of an electron discharge device 266, operating as a cathode follower and having its cathode 267 coupled by means of a capacitor 268 to lead 65. The resultant positive-going pulse developed across cathode resistor 269 causes the closing of gate unit 11, as previously described in connection with Fig. 2, thus terminating the first portion of a complete operating cycle.

For the purpose of extinguishing discharge device 246 very shortly after it fires, there is provided an electron discharge device 270 having a cathode 271 connected to positive potential source 35. Control electrode 272 of device 270 is connected through a resistor 273 and lead 274 to junction 60 in gate trigger circuit 49 (Fig. 2). Control electrode 272 is bypassed to ground by a capacitor 275. Anode 276 of device 270 is connected to anode 249 of discharge device 246. When trigger circuit 49 is on during the measuring portion of each cycle, the left-hand portion of discharge device 50 (Fig. 2) is non-conductive and the potential of junction 60 is such that control electrode 272 is substantially negative with respect to cathode 271 of discharge device 270, so that this device is non-conductive. Upon the firing of discharge device 246, trigger circuit 49 is turned off, the left-hand portion of discharge device 50 becoming conductive and the potential of junction 60 increasing sufficiently to render discharge device 270 highly conductive. The resultant additional current flow through resistor 251 causes the potential of anode 249 of discharge device 246 to fall below that of cathode 247, thereby extinguishing this discharge device. This condition is maintained until the measuring portion of the succeeding complete cycle is initiated.

In order that the anode current of discharge device 239 shall vary linearly with respect to changes in the unknown potential applied to terminal 244 and hence to its control electrode 242, it is necessary that the potential of screen electrode 297 remain substantially constant with respect to that of cathode 240 of discharge device 239. For the purpose of accomplishing this, there is provided a voltage regulator tube 277, preferably of the cold-cathode type, having its cathode 278 connected through an impedance element or resistor 279 to ground, and having its anode 280 connected through an impedance element or resistor 281 to positive potential source 181. Screen electrode 297 of discharge device 239 is connected to anode 280 of regulator tube 277. There is also provided an electron discharge device 282, preferably of the tetrode type and having its cathode 283 connected to cathode 278 of regulator tube 277. Control electrode 284 of discharge device 282 is connected to control electrode 242 of discharge device 239. Screen electrode 285 and anode 286 of discharge device 282 are connected together and to positive potential source 181. Since discharge device 282 operates as a cathode follower, variations in the potential of its control electrode 284 due to changes in the unknown potential applied to input terminal 244 are reflected linearly in the potential drop existing across resistor 279 due to the anode current of discharge device 282. Thus the potential of cathode 283 varies directly as does that of cathode 240 of discharge device 239. Because of the action of voltage regulator tube 277, its anode 280 remains at a substantially constant potential above that of its cathode 278, with the result that the difference in potential between screen electrode 297 and cathode 240 of discharge device 239 remains substantially constant, irrespective of the magnitude of the unknown potential applied between input terminal 244 and ground. The provision of this arrangement for securing a linear relationship between the unknown potential applied to terminal 244 and the anode current of discharge device 239 constitutes an important feature of the present invention.

As previously described, counter and buffer unit 13 (Fig. 3) supply potentials to the control electrodes of the electron discharge devices comprising translator unit 14 (Fig. 4). Since switching of the trigger circuits in the counter unit is accompanied by time delays, it will be apparent that, during the time such switching occurs, the potentials supplied by translator unit 14 may be lower or higher than the ultimate levels achieved by the counter unit upon the completion of switching. Accordingly, it is desirable to provide means for preventing such spurious relatively short-period fluctuations of higher potential from causing premature operation of the comparer unit without, however, appreciably affecting the response of the system due to relatively long-period fluctuations. In order to accomplish this, there is provided an electron discharge device 287, preferably of the tetrode type and having its cathode 288 connected through an impedance element or resistor 289 to a suitable source of positive potential 290. Resistor 289 is shunted by a capacitor 291. Control electrode 292 of discharge device 287 is connected through an impedance element or resistor 293 to translator output terminal 210, and an impedance element or capacitor 294 is connected between this terminal and cathode 288 of discharge device 287. The time constant due to resistor 293 and the input capacitance of discharge device 287 is preferably of the order of the period of the spurious short-period fluctuations at terminal 210 and small compared with the period of the long-period fluctuations. Screen electrode 295 and anode 296 of discharge device 287 are connected together and to positive potential source 181.

In operation, discharge device 287 operates as a cathode follower, so that changes in the potential of control electrode 292 cause corresponding changes in the potential drop across resistor 289, this relationship being substantially linear. Capacitor 294 is therefore always charged to the same value of potential, and it is of sufficient capacitance to cause bypassing of any spurious pulses which may be developed at terminal 210 when the trigger circuits of counter unit 13 are switching. The purpose of capacitor 291 is merely to augment the stabilizing action of capacitor 294 and, although helpful for this purpose, it is not an essential component.

*Measuring a physical displacement*

The system in accordance with the present invention as thus far described is adapted for measuring and indicating the value of an unknown electrical potential. The system of the present invention is equally well adapted for providing a digital manifestation of a physical displacement. Arrangements for accomplishing this are shown in Fig. 5 of the drawings, it being assumed that switch 235 is now in its left-hand position and that switch 237 is in its right-hand or open position.

There is provided a cathode-ray tube 300 having a fluorescent screen 301, horizontal deflecting plates 302, vertical deflecting plates 303, and an electron gun 304. Associated with cathode-ray tube 300 is a suitable power supply 305, together with conventional beam-centering means 306 and 307, respectively associated with horizontal deflecting plates 302 and vertical deflecting plates 303. Disposed on the axis of cathode-ray tube 300 is a lens system 308, and a photocell 309 having an anode 310 connected to power supply 305 and a cathode 311 connected through a potentiometer 312 to ground. Movable arm 313 of potentiometer 312 is connected through switch 235 (when in its left-hand position) to junction 236. Horizontal deflecting plates 302 are coupled by means of a capacitor 314 and switch 235 to translator output terminal 210. Disposed between fluorescent screen 301 of cathode-ray tube 300 and lens system 308 is a mask 315 which is arranged in any desired manner for linear or rotational vertical movement in accordance with the physical displacement to be measured and indicated. One edge 316 of mask 315 is so shaped as to provide a desired relationship between vertical displacement of mask 315 and the distance of edge 316 from the vertical axis of mask 315. As shown by way of example in the drawings, edge 316 is shaped to provide a directly proportional relationship between these two physical dimensions, but it will be understood that any other configuration of edge 316 may be employed if desired.

In operation, let it first be assumed that counter unit 13 (Fig. 3) is set at 0000 and mask 315 is at its initial position corresponding to zero physical displacement of the unknown to be measured. Under this condition, the trace of the electron beam on fluorescent screen 301 of cathode-ray tube 300 is so disposed with respect to mask 315 that an image of it just clears edge 316 of mask 315 and is projected by means of lens system 308 on photocell 309. This causes photocell 309 to be highly conductive, producing a positive potential across potentiometer 312, a desired portion of this potential being applied through movable arm 313 and switch 235 to control electrode 248 of gaseous discharge device 246, thereby causing this device to fire. Device 246 is promptly extinguished in the manner previously described.

Now let it be assumed that mask 315 has moved downward by an amount corresponding with the physical displacement to be measured. Mask 315 now interrupts the projection of the trace image on photocell 309, causing the latter device to become non-conductive, so that there is no appreciable potential drop across potentiometer 312. At the same time, counter unit 13 has begun to operate, causing an increasing potential at translator output terminal 210. This potential is applied to horizontal deflecting plates 302, causing a deflection of the electron beam in a direction toward edge 316 of mask 315. When the potential at terminal 210 reaches a sufficiently high value, the electron beam is deflected enough so that the image of its trace can pass edge 316 of mask 315 and be projected by lens system 308 on photocell 309. This causes the latter device to become highly conductive, so that a high positive potential is developed across potentiometer 312 and applied to control electrode 248 of gaseous discharge device 246, thus causing it to fire and closing gate 11 in the manner previously described.

It will be apparent that the value now standing in counter unit 13 is a function of the displacement of mask 315 and hence equal to or bearing a desired relationship to the physical displacement to be measured. The remainder of the operating cycle for permitting manifestation of the counter value and resetting of the counter in preparation for the next operating cycle is accomplished in the manner previously described in connection with the measurement of an electrical potential.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A measuring device for manifesting an unknown voltage as a numerical quantity, comprising the combination of: a source of oscillations, a counter responsive to said oscillations, gating means interposed between said source and said counter and adapted to control the flow of oscillations therebetween, translating means directly responsive to said counter for developing a potential proportional in magnitude to the count contained in said counter, comparing means for comparing said potential with said unknown voltage and for de-energizing said gating means when said potential is substantially equal to said voltage, means for manifesting the count in said counter, first delay means responsive to said comparing means for subsequently resetting said counter to a predetermined value only after an equality is established, and further delay means responsive to said first delay means for energizing said gating means to enable a new measurement operation.

2. A displacement measuring and manifesting device, comprising the combination of: a source of oscillations, a counter responsive to said oscillations, gating means interposed between said source and said counter to control the flow of oscillations therebetween, translating means connected to the output of said counter and responsive to the count contained in said counter to produce a first potential proportional to the magnitude of said count, means responsive to said first potential and to a second potential corresponding to the displacement to be measured for comparing said first and second potentials, said means comprising a self-restoring trigger circuit for producing an output signal when said first and second potentials are substantially equal, means responsive to said output signal for rendering said gating means inoperative, delay means comprising a second self-restoring trigger circuit responsive to said output signal for resetting said counter after a controllable time interval during which said count is manifested, and a third self-restoring trigger circuit responsive to said delay means to provide a further period of delay prior to rendering said gating means operative to initiate a new measurement operation, whereby the count in said counter represents the displacement measured.

3. A measuring device for manifesting an unknown voltage as a numerical quantity, comprising the combination of: a pulse source, gating means responsive to said source, a counter responsive to said gating means for producing a plurality of potentials representative of the quantity of pulses received, a plurality of voltage clamping circuits directly responsive to said potentials for establishing signals having predetermined voltage levels, a summation network responsive to said signals for producing a reference voltage representing the setting of said counter, comparing means comprising a first self-restoring trigger circuit responsive to said unknown voltage and said reference voltage for de-energizing said gating means when said voltages are substantially equal, a second self-restoring trigger circuit responsive to said comparing circuit for resetting said counter after a controllable duration of time, and a third self-restoring trigger circuit responsive to said second trigger circuit for energizing said gating means after the resetting of said counter is completed, whereby the setting of said counter constitutes a numerical representation of the magnitude of said unknown voltage.

References Cited in the file of this patent

UNITED STATES PATENTS

| | | |
|---|---|---|
| 2,455,532 | Sunstein | Dec. 7, 1948 |
| 2,537,427 | Seid | Jan. 9, 1951 |
| 2,539,623 | Heising | Jan. 30, 1951 |
| 2,568,724 | Earp | Sept. 25, 1951 |
| 2,616,965 | Hoeppner | Nov. 4, 1952 |

OTHER REFERENCES

Radar Electronic Fundamentals—TM 11—466, War Dept., June 29, 1944, page 102.

Electrical Engineering, "The Binary Quantizer," by (Barney), Nov. 1949, pages 962–967.